Patented May 25, 1937

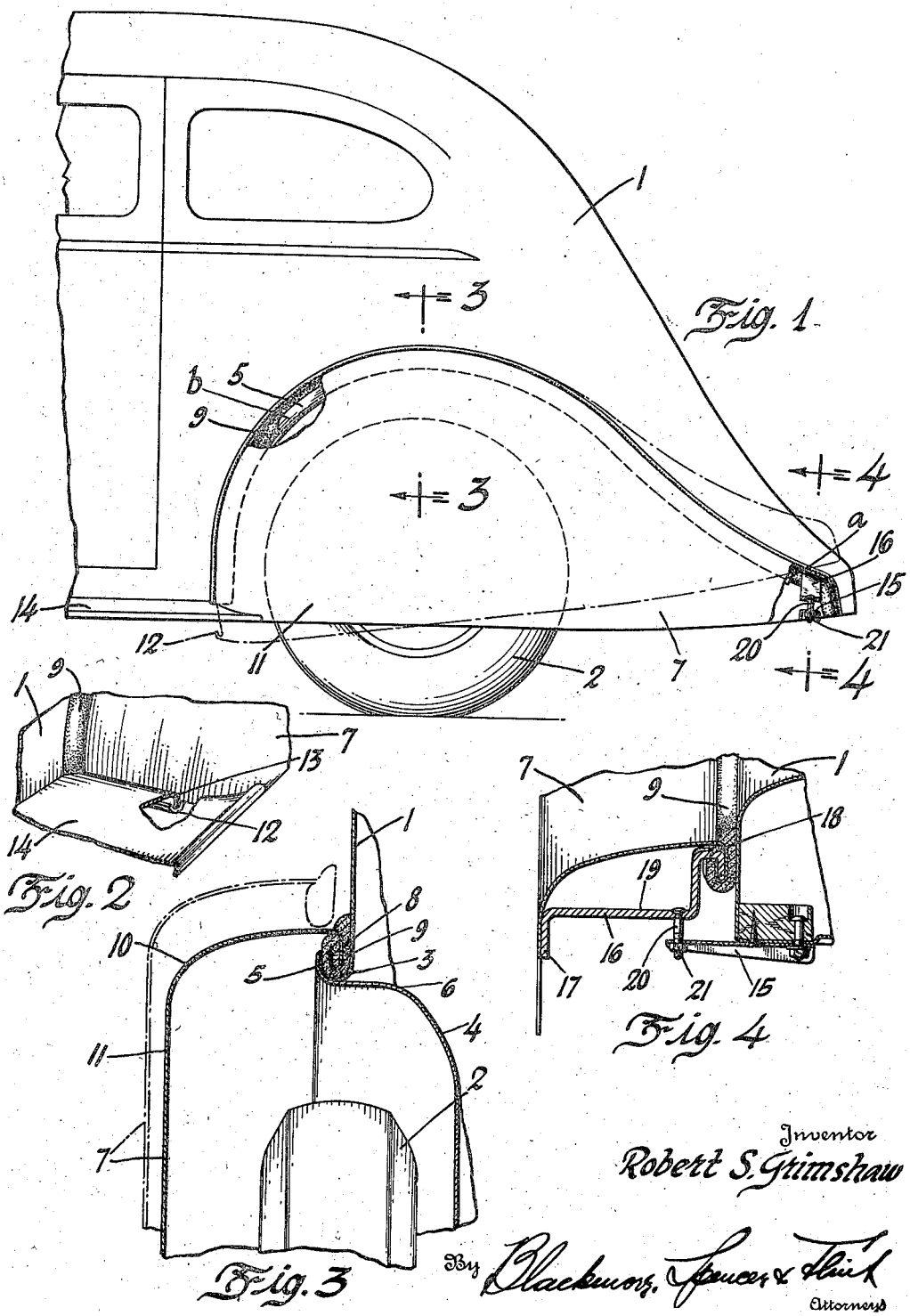

2,081,231

UNITED STATES PATENT OFFICE 2,081,231

AUTOMOBILE WHEEL FENDER

Robert S. Grimshaw, Detroit, Mich., assignor to General Motors Corporation, Detroit, Mich., a corporation of Delaware Application June 21, 1934, Serial No. 731,595

6 Claims. (Cl. 280—153)

The present invention relates to devices for protecting a motor car from the mud and dirt thrown by the wheels and more specifically to fender construction.

One object of my invention is to provide a rear fender for a vehicle which is simply and cheaply constructed and composed of a minimum of parts.

Another object of my invention is to provide a combination rear fender and side or splash shield formed of one piece that have heretofore been made and applied in two or more pieces.

Another object of my invention is to provide means for easily detaching the fender as a unit from the body of the vehicle to make the wheel easily accessible.

With these and other objects in view, my invention consists in the arrangement, combination and construction of the various parts of my improved device, as described in the specification, claimed in the claims and shown in the accompanying drawing, in which:

Figure 1 is a side elevation of the rear portion of a motor car showing my fender in position, with parts broken away to shown connections.

Figure 2 is a detail perspective view of the junction between the front of the rear fender and the running board with a part broken away to show the connection.

Figure 3 is a sectional view taken on line 3—3 of Figure 1.

Figure 4 is a sectional view taken on line 4—4 of Figure 1.

In Figure 1 the numeral 1 designates in general the body of a motor car to which is secured by any well-known means (not shown) a wheel and tire assembly 2. The main plane of the side of the body extends vertically and may be practically in line with the center of the tire as best shown in Figure 3. It extends down to a point above the tire where it is outwardly curled to form a bead 3, the purpose of which will be set forth at a later stage. The shape of this curled bead 3, and consequently the opening in the body, as viewed in Figure 1, is circular and conforms to the shape of the wheel house. The rear half, however, after following the contour of the wheel in spaced relation for a short distance, tapers away to a point considerably to the rear thereof to conform to the shape of the streamline body. This gives roughly a half pear shaped opening in the body. Fitting within this opening is a wheel housing 4 which has a flared edge 5 which curls up around the edge of bead 3 and is secured rigidly thereto. The housing is dished back into the body a sufficient distance to allow wheel clearance as shown at 6.

The fender 7, which is to be secured to the opening in the body and cover the wheel, has its inner edge shaped to conform to the opening. The edge is crimped, as shown at 8, to encompass a rubber welt 9 which also surrounds the outer surface of the crimp and is rigidly secured thereto. The body of the fender is dished outwardly, as shown at 10, and the side wall 11 extends all the way down with the bottom edge approximately in line with the running board to completely encase the wheel.

As shown in Figure 1 the groove formed by the edge 5 and the bead 3 does not extend throughout the whole edge of the opening in the body, but ends just short of the rear of the opening as at $a$ and before the edge of the opening becomes vertical at the front as at $b$. The crimped rubber encased edge of the fender rests within this bead and the fender is supported thereby.

The lower front horizontal edge of the fender has a reverse forwardly bent portion or lip 12 formed thereon which fits around and encases a downwardly directed flange 13 on the rear end of the running board 14 to secure the fender to the running board when the former is in its assembled position.

A bracket arm 15, U-shaped in cross section, is secured to the body or chassis frame by suitable means at the rear tip of the same. It projects outward below the rear tip of the fender. An angled cross member 16 is secured to the fender above this projecting bracket, one end of which is flanged as at 17 and secured to the side wall of the fender by welding, the other end having a reverse bend 18 therein which fits within the crimped edge of the fender to secure the same. The horizontal portion 19 of the bracket has fixedly secured in it a bolt 20 by riveting the head or other suitable means. The end of the bracket is drilled for reception of the bolt 20 and a nut 21 is threaded onto the bolt after its insertion through the hole to secure the fender to the body in normal assembled position.

With the use of wider bodies in the later model cars, the bodies extend out over the wheels more than formerly so that a narrower fender may be used, as shown in this case. Also the application of shields to the sides of the fenders to prevent splashing and partially hide the wheels has become popular. This invention has embodied both the narrow fender and the shield in one unitary piece but due to the shield it can be seen that it is necessary to remove the whole to change a tire. This invention has made this removal very simple and allows ample room to place the jack and remove the tire.

To remove the fender it is merely necessary to take off nut 21 and pick up the rear end of the fender. This will cause a rotational movement of the fender to the dotted line position, shown in Figure 1. This disengages the lip 12 from the flange 13 of the running board and then the fender may be lifted bodily off which picks the crimped rubber covered edge out of the bead 3. To reassemble is, of course, merely the reverse.

From the foregoing it can be seen that I have provided a simple unitary construction of a fender and side shield which is easily attachable and gives ready access to the wheel for tire changes.

I claim:

1. In an automobile having a body and wheels, an opening in the side of the body, a wheel housing secured in the opening, the edges of both the wheel housing and the body being secured together and a bead formed of the two, a one-piece dished fender extending down outside the wheel to conceal it, the inside edge of the fender being crimped and fitting within the bead to support the fender, and means securing the rear of the fender to the body or chassis to lock the fender in place.

2. In an automobile having a body, running board and wheels, an opening in the side of the body, a wheel housing secured in the opening, the edges of the wheel housing and the body being secured together and a bead formed of the two, a one-piece dished fender extending down outside the wheel to conceal it, the inside edge of the fender being crimped and fitting within the bead to support the fender, a flange on the rear of the running board, a lip on the front of the fender to engage the flange, and means for securing the rear of the fender to the body or chassis to lock the fender in place.

3. A wheel fender for an automobile comprising a sheet metal stamping having an arched portion and an outer flat side wall, a lip formed on the forward end, the inner edge being crimped and holding a distorted layer of resilient material therein to cover the crimp and a cross member secured to the rear portion, the lip, crimped edge and cross member all being used to secure the fender upon a car.

4. In an automobile having a body, running board and wheels, an opening in the side of the body to accommodate a wheel, a wheel housing secured therein, a fender whose attaching edge is the same shape as the opening, a bead formed of the edge of the wheel housing and body edge, the inner edge of the fender being crimped and adapted to fit in the bead to prevent lateral displacement but allow longitudinal relative movement, a flange on the rear of the running board and a lip on the fender to interlock when the fender is in place and locking means on the rear of the fender to keep said interlocking relation and prevent relative rotation of the fender with respect to the body.

5. In an automobile having a body, running board and wheels, a wheel housing secured in the body, a wheel concealing skirt, means on the skirt to interengage the running board and wheel housing upon relative rotary motion of the skirt with respect to the body to secure and position the skirt over the wheel.

6. In an automobile having a body, running board and wheels, a wheel housing secured in the body, a wheel concealing skirt, means on the skirt to interengage the running board and wheel housing upon relative rotary motion of the skirt with respect to the body to secure and position the skirt over the wheel and locking means between the skirt and the chassis once the former is in place.

ROBERT S. GRIMSHAW.